No. 614,693. Patented Nov. 22, 1898.
F. BORDESSOUL.
DRIVING MECHANISM.
(Application filed Feb. 10, 1897.)
(No Model.)

Witnesses.
Marcus H. Miles
Grenville Lewis Jr.

Inventor.
Felix Bordessoul,
By Hewson & Hewson,
his Attys.

UNITED STATES PATENT OFFICE.

FÉLIX BORDESSOUL, OF LA GARENNE-DE-COLOMBES, FRANCE.

DRIVING MECHANISM.

SPECIFICATION forming part of Letters Patent No. 614,693, dated November 22, 1898.

Application filed February 10, 1897. Serial No. 622,828. (No model.)

*To all whom it may concern:*

Be it known that I, FÉLIX BORDESSOUL, a citizen of the Republic of France, and a resident of La Garenne-de-Colombes, France, have invented a new and useful Improvement in Driving Mechanism, of which the following is a specification.

The driving mechanism which forms the subject of the present invention has for its object to transform by a novel arrangement an alternating reciprocating movement into a continuous rotary motion. It is capable of numerous applications, more particularly to the traction of vehicles on roads or rails, the propulsion of vessels, flying-machines, and the like.

I will now describe this mechanism with reference to the accompanying drawings, which show it applied to a quadricycle actuated by manual power.

Figure 1:
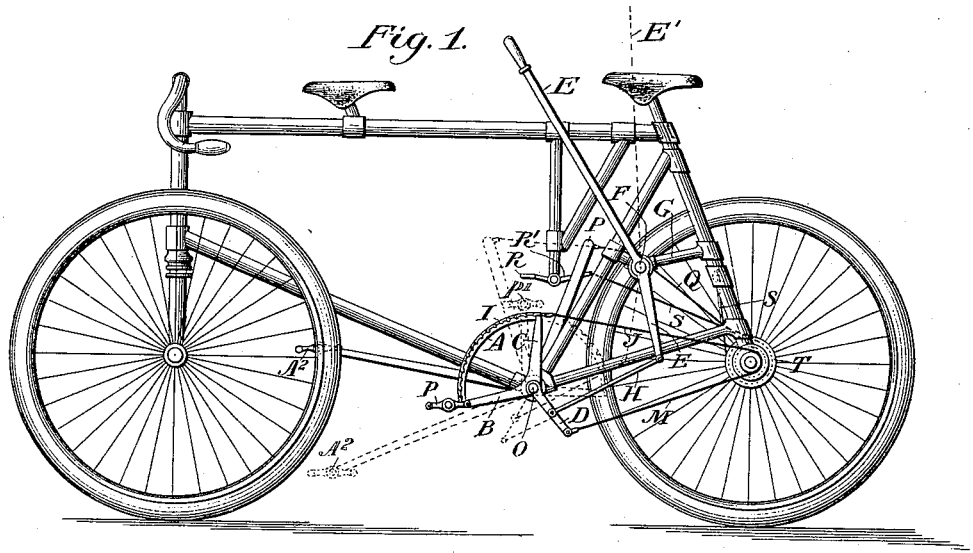
Figure 2:
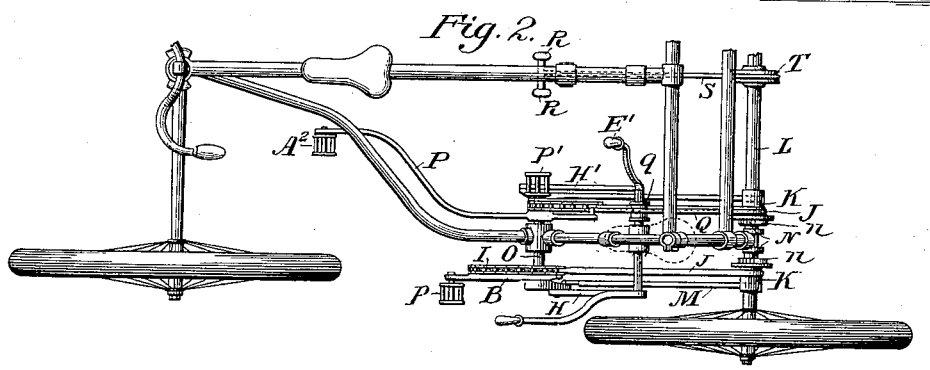
Figure 3:
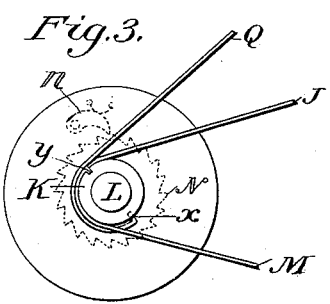
Figure 4:
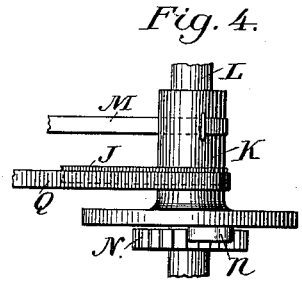

Figure 1 is a side elevation of a quadricycle. Fig. 2 is a plan view showing one-half of the vehicle. Figs. 3 and 4 represent side and plan views, respectively, of a detail.

This vehicle is provided with three seats—the first placed toward the front, in the center of the quadricycle, the two others toward the rear, side by side, at equal distances from the center. The rear seat (shown in Fig. 2) is in dotted lines. From each rear seat a double system of mechanism is operated, the two mechanisms having identical actions, and combined for producing the rotation of the driving-shaft. A description of a single one of the rear mechanisms will be sufficient, the four mechanisms forming the two symmetrical systems for each rear seat being absolutely the same. In this arrangement the occupant of the front seat pedals and steers the vehicle, while the occupants of the rear seats pedal and operate the hand-levers situated at their right and left sides.

In Fig. 1 the various parts of the mechanism operated by the left foot or hand of the different riders are shown in full lines, while the right-side mechanism is in dotted lines.

A steel frame or sector B C, carrying a toothed segment A, is mounted loosely on the shaft O. One of the arms B of the frame carries at its extremity a spindle on which is mounted a pedal.

A chain I, fixed at one end to the arm B of the sector and passing over the segment A, is prolonged by a steel spring-band J, fixed on the other end to a loose pulley K, (or its sleeve,) placed on the rear axle L of the machine.

This steel spring-band J may be wound on this pulley, so that in being drawn forward it unwinds, and thus turns the pulley K. The loose pulley K, Figs. 3 and 4, has a pawl $n$, capable of acting on a ratchet-wheel N, keyed on the rear axle L in one direction, the pawl $n$ slipping over the ratchet-teeth in the reverse direction. In order to assist the movement of the foot on the pedal, a lever E E' is pivoted on a movable shaft F in a support G, connected with the frame and provided with a handle at its upper end. A link H connects the lower end of this lever to the end of a small lever D, fixed on the frame B C in an opposite direction to the arm carrying the pedal. A second spring-band M is also fixed to the sleeve of the pulley K and wound thereon in an opposite direction to that of the band J. The other end of this band M is fixed at the end of the small lever D of the sector-frame. I call this steel arm D a "reversing-lever."

It will be seen that in pressing the pedal $p$ downward or the lever E forward, or both together, as in normal working, the band J in moving forward unwinds from the sleeve of the pulley K and turns the pulley, while the band M, moving in the opposite direction, is wound up on the sleeve of the pulley K. On the return movement of the pedal $p$ and lever E the band M is unwound by means of the reversing-lever D, causing the pulley K to turn backward and wind up the band J. During the return movement of the left pedal and lever the right pedal and lever are actuated in their forward motion, producing a continuation of the movement of the shaft L.

A special arrangement has been adopted to enable the person pedaling from the front seat to assist in operating the driving-shaft. The arrangement has been applied to the two mechanisms placed in the interior of the apparatus. It comprises an elbow-lever P, moving on the axis O, which supports the sectors. The front end of the lever P has a pedal $A^2$. The other end is connected to a steel spring Q, fixed on the other end at the same point of the loose pulley K as the spring J. The band Q is guided by a small roller $q$, mounted loosely on the axis of the motor-lever E.

A brake is arranged at the center of the machine. It is composed, essentially, of two levers R R', the displacement of which produces the tightening of a steel band S on a pulley T, keyed on the rear axle. It is mounted in such a way (see Fig. 1) that friction is produced on more than three-quarters of the external surface of the pulley.

The working of the apparatus is as follows: For each double system the complete movement is obtained by the successive movement of the two mechanisms at the right and left. It is therefore only necessary to describe a single system—that of the right—and the movement of this right side will be described. The first step comprises the simultaneous displacement of the pedal P of the sector of the lever-arm E and the reversing-lever D. The endless chain I is wound up on the sector. The spring J, connected therewith, consequently unwinds and causes the movement of the rear shaft L. At the same time the reversing-spring M is wound up on the loose pulley K. When the sector has described an angle of ninety degrees, the spring J is completely unwound and the reversing-spring M is wound up on the loose pulley K. When the sector has described an angle of ninety degrees, the spring J is completely unwound and the reversing-spring M completely wound up. The first step is terminated and the sector A occupies the position shown in full lines in Fig. 1. The second step comprises a similar displacement of the mechanism on the left-hand side, which produces the continuation of the movement of the shaft. During the second step the mechanism of the right-hand side moves backward, the lever-arm E is returned, and the action is transmitted to the sector and the returning-lever D. The returning-spring M unwinds, causing the movement of the loose pulley K, on which the motor-spring J, fixed to the sector, is then wound, and the motor-spring Q, fixed to the bent lever P of the front pedaler, is also wound. When the rearward movement is terminated, the second step is completed and the first one is recommenced. A continuous movement is thus produced.

Each front pedal acts, respectively, on the sector situated at its side. The movements of the mechanisms situated in the interior of the system must therefore be an inverse one to the other.

To sum up, when working normally and considering the two double systems the movements of the external mechanisms of the left and the interior of the right are similar, and the movements of the internal mechanism of the left and the external of the right are also similar.

This apparatus allows of there being obtained by a combined action of the arms and legs a very complete utilization of manual power. In fact, the movement of the machine is independent of the motor—that is to say, that after having received an impulsion it continues to move, although the motor be no longer acted upon, while maintaining the feet resting on the pedals and the hands on the levers.

I claim as my invention—

1. Driving mechanism for cycles, &c., comprising a driving-shaft, a loose pulley mounted thereon and pawl-and-ratchet mechanism to engage the pulley and shaft when the pulley is moved in one direction only, in combination with two bands secured to the said pulley and wound thereon in opposite directions, a pedal, connections between the pedal and one of the said bands to drive the pulley forward, a hand-lever and connections between the hand-lever and the other of said bands to return the pulley, substantially as set forth.

2. In a velocipede adapted to be driven by a plurality of riders, but steered by one only, the combination of a driving-shaft; pulleys mounted loose thereon and pawl-and-ratchet mechanisms to engage the pulleys and shafts when the pulleys are moved in one direction only, with bands secured to the pulleys and wound thereon, pedal mechanisms for each of the riders, adapted to unwind the said bands and turn the pulleys, reversing-bands M also secured to the said pulleys and wound thereon in an opposite direction to the other bands and hand-lever mechanism for all the riders except the one who steers for actuating the reversing-bands and aiding the pedal mechanism, all substantially as and for the purposes set forth.

In testimony whereof I have signed my name to this specification in the presence of two subscribing witnesses.

FÉLIX BORDESSOUL.

Witnesses:
JOSEPH DELAGE,
EDWARD P. MACLEAN.